No. 834,619. PATENTED OCT. 30, 1906.
L. E. HOFFMAN.
DIFFERENTIAL DRIVING GEAR.
APPLICATION FILED JULY 29, 1903.
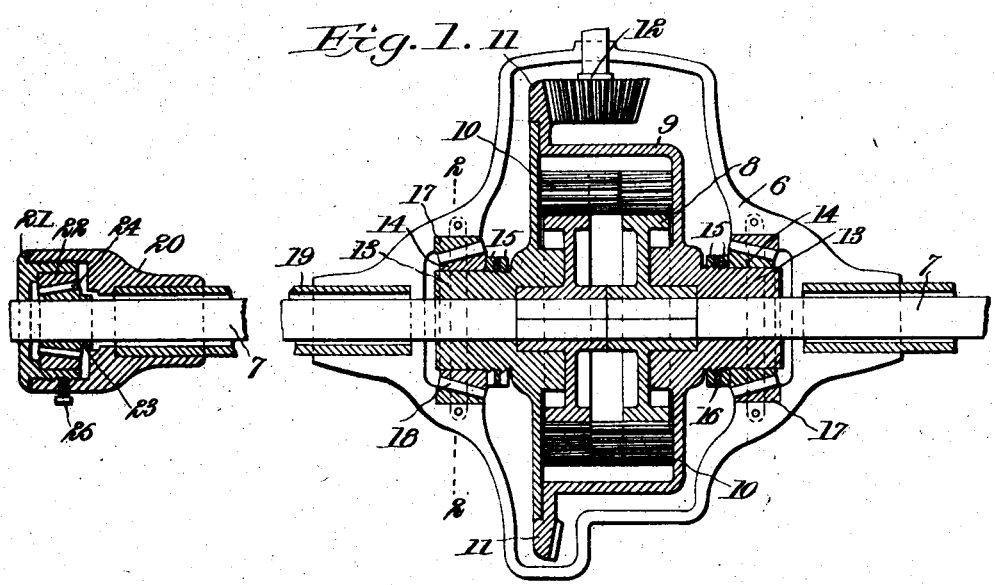
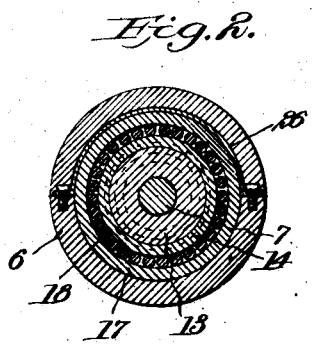

UNITED STATES PATENT OFFICE.

LOUIS E. HOFFMAN, OF CLEVELAND, OHIO.

DIFFERENTIAL DRIVING-GEAR.

No. 834,619.

Specification of Letters Patent.

Patented Oct. 30, 1906.

Application filed July 29, 1903. Serial No. 167,429.

*To all whom it may concern:*

Be it known that I, LOUIS E. HOFFMAN, a citizen of the United States, residing at Cleveland, in the county of Cuyahoga and State of Ohio, have invented new and useful Improvements in Differential Driving-Gears, of which the following is a specification.

This invention relates particularly to differential driving-gears for automobiles, said gear being mounted upon the rear or driving axle and acting to allow the traction-wheels to turn at different speeds necessary when the vehicle turns a curve.

The object of the invention is to provide an improved bearing for the planetary or equalizing gear-wheel and means for adjusting those bearings to keep the differential gear in proper alinement with respect to the main axles.

Heretofore it has been customary to mount the differential or planetary gear wheel or casing upon bearings on the main driving-axle, and this has the objection that as the bearings become worn the differential will become crowded or moved sidewise, particularly where there is a bevel-drive, thus throwing the differential out of alinement and making a loose connection at the bevel-gearing. My invention avoids these defects by mounting the differential on bearings in the inclosing jacket or housing instead of on bearings on the axle. This construction has the further advantage that the differential is supported independently in the housing and the main axles can be removed and inserted without disturbing the differential. Also the bearings of the differential can be tightened or adjusted to take up wear.

In the accompanying drawings, Figure 1 is a longitudinal section of an embodiment of my invention, and Fig. 2 is a cross-section on the line 2 2 of Fig. 1.

Referring specifically to the drawings, 6 indicates the housing which contains the differential gearing. This housing is split, and the upper half is removable to enable the gearing and bearings to be got at and adjusted, as hereinafter explained. The main axles which carry the traction-wheels are indicated at 7, and upon their squared ends are fitted the spur-gears 8. The differential gear-casing is indicated at 9. This incloses said spur-wheels and carries pinions 10 in mesh therewith, and upon the outside of this gear-casing is a bevel gear-ring 11, meshing with the driving-pinion 12. These parts are old and are believed to require no further description. It will be understood that when the gear-casing is rotated it will drive the axles, while permitting the differential movement thereof incident to turning a curve.

Instead of finding its bearings upon the hubs of the spur-gears or upon the main axles, as heretofore, the planetary gear-casing is provided by me with bearings upon the housing. To effect this, projecting hubs 13 are secured to the casing 9, and the axle 7 extends through these hubs at an easy fit. The hubs may be formed integral with the casing 9, if desired. Upon the outside of these hubs are bearing cones or rings 14, behind which the hubs are threaded to receive adjusting-nuts 15, between which is a washer 16.

17 indicates bearing cups or rings which are stepped into the housing 6, and the bearings are completed by rollers 18 between the cups and cones. Obviously plain or ball bearings may be used, if desired.

The gear-housing 6 is connected by the tubular axle-casing 19 to the bearing box or case 20 at the end of the axle, and to prevent withdrawal of the axle from the spur-gear of the differential in consequence of any axial thrust a cone-bearing is provided at the end of the axle, comprising a nut 21, screwed into the box 20, a cup 22, carried by the nut, a cone 23, fast in the axle, and rollers 24 between. The nut is held by a screw at 25.

It will be seen that the gear wheel or casing 9 finds its bearings in the housing instead of upon the axles and the housing takes the thrust incident to the bevel-drive instead of causing wear upon the axles and consequent loose contact with the driving-pinion, as heretofore. By means of the nuts 15 the bearings are adjustable to take up all wear and to keep the differential in perfect alinement with the axles. To get at the gear for the purpose of adjustment, it is simply necessary to take off the upper half of the housing, and to hold the cup 17 in place when this is done a strap 26 is used. This is bolted to the lower half of the housing and extends around over the cup.

Removal of the axles without unshipping the differential may be readily and quickly performed by taking out the nut 21, after which the whole axle may be slipped out endwise, withdrawing from the spur-gear and leaving the whole differential gear suspended in its own bearings in the housing.

It is obvious that the invention is not limited to the particular form of differential gearing herein shown, nor otherwise than is expressed in the following claims.

What I claim as new, and desire to secure by Letters Patent, is—

1. The combination with a housing, and a differential gear supported in bearings thereon, of axle-sections extending into the housing and engaged by the gear and removable therefrom without displacing the gear.

2. The combination with axle-sections and a differential mechanism engaged therewith between the same, of a housing over the axle-sections and said mechanism, having supporting-bearings for the mechanism, and thrust-bearings within the housing and upon the axle-sections at the outer ends thereof, preventing outward endwise movement of the axle-sections.

3. The combination with a differential gear, and axle-sections removable therefrom, of a housing having bearings sustaining the gear, and bearing-boxes at the outer ends of the axle, and conical bearings in the boxes, preventing endwise movement of the axle.

4. The combination of a housing having two laterally-extending tubes, a differential drum rotatably mounted on bearings in said housing, two axle-sections independently rotatable in said tubes and in the differential drum, gears loosely mounted on the inner ends of said axle-sections, permitting free endwise removal or withdrawal of the sections from the gears, pinions carried on said differential drum and engaging the gears referred to, and means for rotating said drum.

5. The combination of a split housing, bearing-rings set therein, straps secured at their ends to one part of the housing and extending over the rings to hold the same in place, a differential mechanism in the housing having its bearings on said rings, and axle-sections engaged with the differential mechanism.

In testimony whereof I have signed my name to this specification in the presence of two subscribing witnesses.

LOUIS E. HOFFMAN.

Witnesses:
JOHN A. BOMMHARDT,
LOTTIE NEWBURN.